United States Patent
Saydag

(10) Patent No.: US 9,785,279 B2
(45) Date of Patent: Oct. 10, 2017

(54) TOUCH DISTANCE BASED ON A COLUMN WEIGHTED SENSOR VALUE

(71) Applicant: Hewlett-Packard Development Company, L.P., Houston, TX (US)

(72) Inventor: Sait Can Saydag, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/114,351

(22) PCT Filed: Jan. 31, 2014

(86) PCT No.: PCT/US2014/014323
§ 371 (c)(1),
(2) Date: Jul. 26, 2016

(87) PCT Pub. No.: WO2015/116218
PCT Pub. Date: Aug. 6, 2015

(65) Prior Publication Data
US 2017/0003802 A1   Jan. 5, 2017

(51) Int. Cl.
*G06F 3/00* (2006.01)
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC .................. G06F 3/0416; G06F 3/044
See application file for complete search history.

(56) References Cited

U.S. PATENT DOCUMENTS

| | | | |
|---|---|---|---|
| 6,392,636 B1 | 5/2002 | Ferrari et al. | |
| 8,462,127 B2 | 6/2013 | Chiu et al. | |
| 8,508,244 B2 | 8/2013 | Seguine | |
| 2008/0024455 A1 | 1/2008 | Lee et al. | |
| 2009/0091551 A1 | 4/2009 | Hotelling et al. | |
| 2011/0221701 A1 | 9/2011 | Zhang et al. | |
| 2012/0044197 A1 | 2/2012 | Polishchuk et al. | |
| 2012/0056841 A1 | 3/2012 | Krenik et al. | |
| 2013/0256512 A1* | 10/2013 | Shioya | H04N 5/3355 250/208.1 |
| 2013/0257803 A1 | 10/2013 | Layton | |
| 2014/0002407 A1 | 1/2014 | Badaye et al. | |
| 2015/0261356 A1* | 9/2015 | Shepelev | G06F 3/044 345/174 |

FOREIGN PATENT DOCUMENTS

CN          101667086 A          3/2010

OTHER PUBLICATIONS

Dietz, P. et al., "DiamondTouch: A Multi-User Touch Technology," (Research Paper), Nov. 6, 2001, 8 pages, available at http://dl.acm.org/citation.cfm?id=502389.

* cited by examiner

*Primary Examiner* — Muhammad N Edun
(74) *Attorney, Agent, or Firm* — HP Inc. Patent Department

(57) ABSTRACT

A touch panel system including an array of sensing elements in rows and columns and a device to sum sensor values of multiple sensing elements in a column to provide a column sensor value. The device to multiply the column sensor value by a column number to provide a column weighted sensor value to determine a horizontal distance in the array.

15 Claims, 3 Drawing Sheets

TOUCH DISTANCE BASED ON A COLUMN WEIGHTED SENSOR VALUE

BACKGROUND

User interfaces are systems by which people interact with machines to operate and control the machines and receive feedback from the machines. Typically, to interface to an electronic system, a user interface includes hardware and software components. Different types of user interfaces include graphical user interfaces that accept input via devices such as a computer keyboard and mouse, web-based user interfaces that accept input and provide output by generating web pages, and touch panels or touchscreens that display information and accept input by the touch of a finger or stylus.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Touch panels, such as touch pads and touchscreens, are used in a number of products including mobile devices and printer products. In some examples, capacitive touch panels provide better user experiences than tactile buttons and resistive touch panels. However, capacitive touch panels are more expensive than tactile buttons and resistive touch panels. In one example, lower end or less expensive printer products include tactile buttons and higher end or more expensive printer products include capacitive touch panels.

In some examples, capacitive touch panels include one or two layers of indium tin oxide (ITO) precisely dimensioned and having a precise thickness for accurate touch sensing on the touch panel. Also, in some examples, capacitive touch panels use more powerful and more expensive microcontrollers to convert signals from the touch panels to touch locations on the touch panel. These precision ITO layers and more powerful microcontrollers increase the cost of the capacitive touch panels making them less suitable for lower end products. While tactile buttons are less expensive, they limit the user interface and the scalability of the user interface.

In examples of the present disclosure, a single layer of ITO is disposed on one side of a substrate to provide an array of individual sensing elements in a touch panel. In some examples, the individual sensing elements in the array of sensing elements have simple geometric shapes with relaxed tolerances and the thickness of the ITO layer has a relaxed tolerance, which increases manufacturing yields and reduces cost. Touch location is determined by a device, such as a less powerful and less expensive microcontroller, using a linear touch location algorithm. The single ITO layer having relaxed tolerances and the less expensive microcontroller make examples of the present disclosure more suitable for lower end products.

Figure 1:
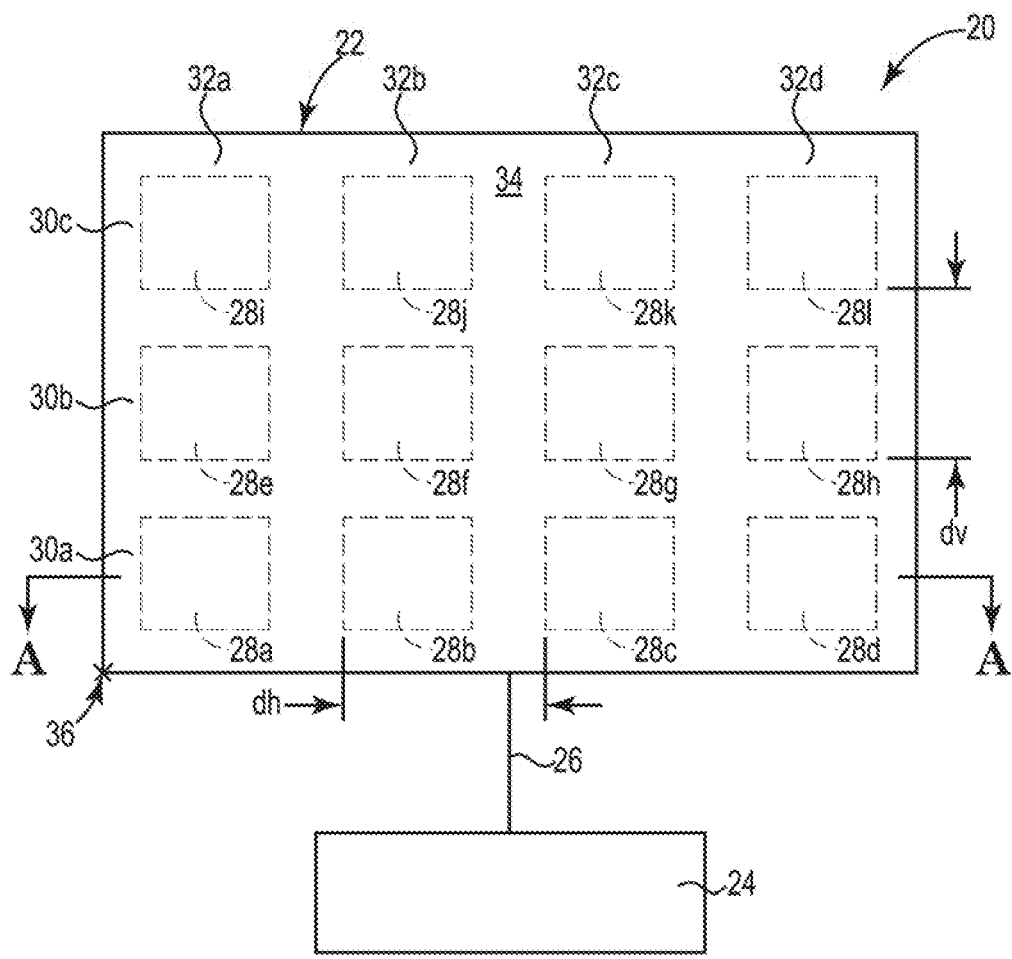
FIG. 1 is a diagram illustrating one example of a touch panel system.

FIG. 1 is a diagram illustrating one example of a touch panel system 20 that determines a touch location on an array of sensing elements 22 using control device 24. Touch panel 20 includes the array of sensing elements 22 and the control device 24 communicatively coupled via communications path 26. The array of sensing elements 22 includes individual sensing elements 28a-28l in three rows 30a-30c and four columns 32a-32d on a substrate 34. Control device 24 is communicatively coupled to each of the individual sensing elements 28a-28l via communications path 26. In one example, each of the sensing elements 28a-28l is an individual capacitive sensing element. In one example, each of the sensing elements 28a-28l is formed from a single layer of ITO on a substrate 34, such as glass.

The first row (1) from the touch panel origin 36 is row 30a, the second row (2) from the touch panel origin 36 is row 30b, and the third row (3) from the touch panel origin 36 is row 30c, where row 30a includes sensing elements 28a-28d, row 30b includes sensing elements 28e-28h, and row 30c includes sensing elements 28i-28l. The first column (1) from the touch panel origin 36 is column 32a, the second column (2) from the touch panel origin 36 is column 32b, the third column (3) from the touch panel origin 36 is column 32c, and the fourth column (4) from the touch panel origin 36 is column 32d, where column 32a includes sensing elements 28a, 28e, and 28i, column 32b includes sensing elements 28b, 28f, and 28j, column 32c includes sensing elements 28c, 28g, and 28k, and column 32d includes sensing elements 28d, 28h, and 28l. In some examples, the array of sensing elements 22 includes more or less than twelve sensing elements. In some examples, the array of sensing elements 22 includes more or less than three rows and/or more or less than four columns.

In some examples, control device 24 includes a microcontroller or a micro-processor, non-transitory computer readable media, such as random access memory (RAM), read only memory (ROM), and programmable read only memory (PROM), and a sensor measuring device that reads sensor values of sensing elements 28a-28l. Control device 24 executes computer readable instructions out of the non-transitory computer readable media to determine a touch location on touch panel 20. Control device 24 determines an x-axis or horizontal distance from the touch panel origin 36 and a y-axis or vertical distance from the touchpad origin 36. In some examples, control device 24 includes a microcontroller or a micro-processor that includes non-transitory computer readable media, such as RAM, ROM, and/or PROM, and the micro-controller or micro-processor reads the sensor values of sensing elements 28a-28l.

To determine the horizontal distance from the touch panel origin 36, control device 24 executes computer readable instructions to sum sensor values of the sensing elements 28a-28l in one of the columns 32a-32d and provide a column sensor value for the column. Control device 24 multiplies the column sensor value of the column by the column number (1-4), as referenced from the origin 36, to provide a column weighted sensor value. Control device 24 sums the column weighted sensor values of the columns 30a-30d to provide a column total. To provide a horizontal distance multiplier, control device 24 determines an array sensor value total by summing the sensor values of sensing elements 28a-28l in the array of sensing elements 22 and dividing the column total by the array sensor value total. In one example, the number one is subtracted from the horizontal distance multiplier and the result multiplied by the horizontal distance dh between sensing elements 28a-28l to determine the horizontal touch distance from the origin 36.

To determine the vertical distance from the touch panel origin 36, control device 24 executes computer readable instructions to sum sensor values of the sensing elements 28a-28l in one of the rows 30a-30c and provide a row sensor value for the row. Control device 24 multiplies the row sensor value of the row by the row number (1-3), as referenced from the origin 36, to provide a row weighted sensor value, and sums the row weighted sensor values of the rows 30a-30c to provide a row total. To provide a vertical distance multiplier, control device 24 determines the array sensor value total by summing the sensor values of sensing elements 28a-28l in the array of sensing elements 22 and divides the row total by the array sensor value total. In one example, the number one is subtracted from the vertical distance multiplier and the result multiplied by the vertical distance dv between sensing elements 28a-28l to determine the vertical touch distance from the origin 36.

In some examples, touch panel 20 measures raw sensor values from each of the sensing elements 28a-28l and normalizes the raw sensor values to provide normalized sensor values that are used as sensor values to determine the horizontal and vertical touch distances from the origin 36. In one example, touch panel 20 measures raw sensor values from each of the sensing elements 28a-28l and normalizes the raw sensor values in a linear normalization algorithm to provide normalized sensor values that are used as sensor values to determine the horizontal and vertical distances from the origin 36.

Figure 2:
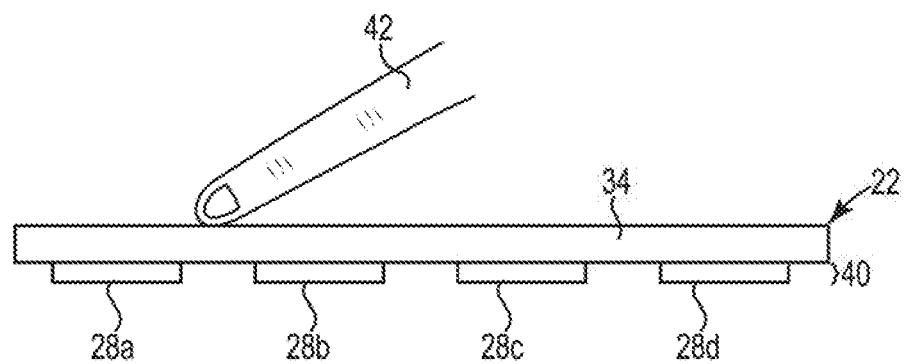
FIG. 2 is a diagram illustrating one example of a cross-section of the touch panel system of FIG. 1 taken along the line A-A in FIG. 1.

FIG. 2 is a diagram illustrating one example of a cross-section of touch panel 20 taken along the line A-A in FIG. 1. Touch panel 20 includes substrate 34 and a layer of ITO 40 that is formed into sensing elements 28a-28l including sensing elements 28a-28d. In one example, substrate 34 includes glass. In some examples, ITO is disposed on substrate 34 using one or more of physical vapor deposition, electron bean evaporation, and sputter deposition, and the ITO 40 is etched to form sensing elements 28a-28l.

Each of the sensing elements 28a-28l is a capacitive sensing, element that changes capacitance value when a person 42 touches substrate 34 near the sensing element. Control device 24 measures a sensor capacitance value for each of the individual sensing elements 28a-28l in the array of sensing elements 22. In some examples, control device 24 measures the capacitance of a sensing element by using the capacitance to control the frequency of an oscillator, where the capacitance forms a part of an RC circuit or an LC circuit and the unknown capacitance is charged with a known current. The capacitance of the sensing element can be determined by measuring the charge time required to reach a threshold voltage or by measuring the oscillator's frequency. In some examples, control device 24 measures capacitance by variations in the level of coupling or atteuation of an alternating current (AC) signal.

Figure 3:
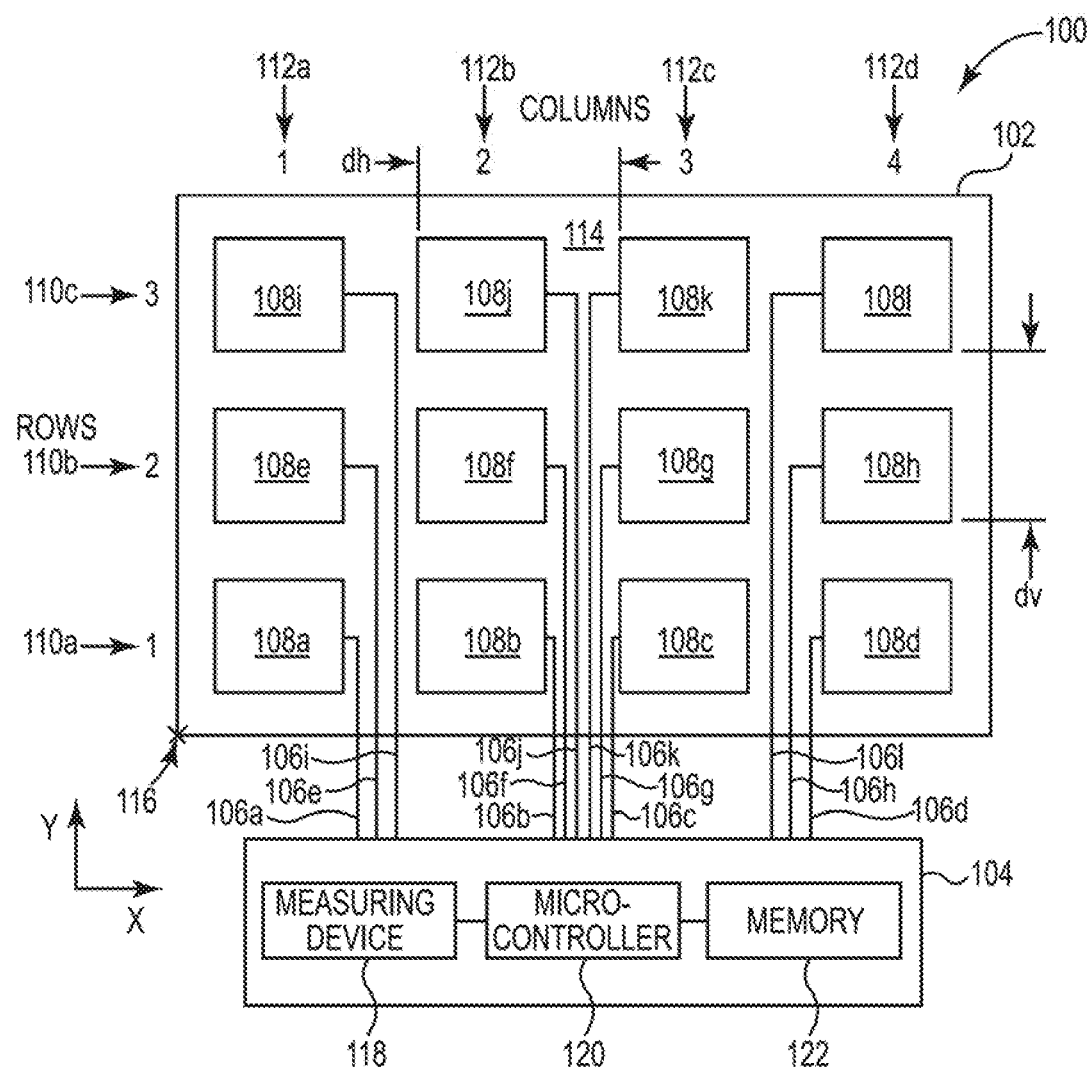
FIG. 3 is a diagram illustrating one example of a touch panel system that determines horizontal and vertical touch distances based on normalized sensor values.

FIG. 3 is a diagram illustrating one example of a touch panel system 100 that determines horizontal and vertical touch distances based on normalized sensor values. Touch panel 100 includes an array of sensing elements 102 and a control device 104 communicatively coupled via communications paths 106a-108l. The array of sensing elements 102 includes individual sensing elements 108a-108l in three rows 110a-110c and four columns 112a-112d on a substrate 114. Control device 104 is communicatively coupled to each of the individual sensing elements 108a-108l via communications paths 106a-106l, respectively. In one example, each of the sensing elements 108a-108l is an individual capacitive sensing element. In one example, each of the sensing elements 108a-108l is formed from a single layer of ITO on a substrate 114, such as glass.

The first row (1) from the touch panel origin 116 is row 110a, the second row (2) from the touch panel origin 116 is row 110b, and the third row (3) from the touch panel origin 116 is row 110c, where row 110a includes sensing elements 108a-108d, row 110b includes sensing elements 108e-108h, and row 110c includes sensing elements 108i-108l. The first column (1) from the touch panel origin 116 is column 112a, the second column (2) from the touch panel origin 116 is column 112b, the third column (3) from the touch panel origin 116 is column 112c, and the fourth column (4) from the touch panel origin 116 is column 112d, where column 112a includes sensing elements 108a, 108e, and 108i, column 112b includes sensing elements 108b, 108f, and 108j, column 112c includes sensing elements 108c, 108g, and 108k, and column 112d includes sensing elements 108d, 108h, and 108l. In some examples, the array of sensing elements 102 includes more or less than twelve sensing elements. In some examples, the array of sensing elements 102 includes more or less than three rows and/or more or less than four columns.

In one example, control device 104 includes a sensor measuring device 118, a micro-processor or micro-controller 120, and memory 122 that includes non-transitory computer readable media, such as RAM, ROM, PROM, and/or disk drive memory. Micro-controller 120 executes computer readable instructions from memory 122 to determine a touch location on touch panel 100. Sensor measuring device 118 reads raw sensor values from sensing elements 108a-108l and micro-controller 120 normalizes the raw sensor values to provide normalized sensor values. Micro-controller 120 determines an x-axis or horizontal distance from the touch panel origin 116 and a y-axis or vertical distance from the touchpad origin 116 based on the normalized sensor values. In some examples, micro-controller 120 includes memory 122 and/or sensor measuring device 118.

In one example, sensor measuring device measures a raw sensor value sij from each of the sensing elements 108a-108l, where i is the row number and j is the column number of the sensing element. Micro-controller 120 receives the raw sensor value sij and normalizes the raw sensor value sij to provide a normalized sensor value Sij.

In one example, micro-controller 120 receives the raw sensor value sij and normalizes the raw sensor value sij using a linear normalization algorithm to provide the normalized sensor value Sij as in Equation I.

$$Sij = (sij * mij) - nij \qquad \text{Equation I}$$

where mij and nij are normalization coefficients determined by characterizing each of the sensing elements 108a-108l.

The mij and nij values are determined by reading a sensor when the sensor is not touched to provide a no touch value sij(no touch) and by reading the sensor when the sensor is touched to provide a touch value sij(touch). The value of mij is determined as shown in Equation II and the value of nij is determined as shown in Equation III.

$$mij = \frac{(0 - 255)}{(sij(notouch) - sij(touch))} \quad \text{Equation II}$$

$$nij = m * sij(\text{no touch}) \quad \text{Equation III}$$

In one example, raw sensor values sij range from 0 to 1024, with the no touch value sij(no touch) closer to 0, such as 100 or 200, and the maximum touch value sij(touch) closer to 1024. These raw sensor values sij are normalized to normalized sensor values Sij between 0 and 255 via Equations I-III In one example, micro-controller 120 uses the normalized sensor values Sij to determine the x-axis or horizontal distance X of a touch from the touch, panel origin 116 and the y-axis or vertical distance Y of a touch from the touchpad origin 116. As the touch panel 100 is being touched, sensor measuring device 118 measures a raw sensor value sij from each of the sensing elements 108a-108l. Micro-controller 120 normalizes the raw sensor values sij using the linear normalization algorithm of Equation I to provide normalized sensor values Sij. Next, micro-controller 120 determines the horizontal distance X and the vertical distance Y according to Equations IV and V.

$$X = dh \left\{ \left[ \frac{\sum_{j=1}^{c} \left( j \sum_{i=1}^{r} Sij \right)}{\sum_{i=1}^{r} \sum_{j=1}^{c} Sij} \right] - 1 \right\} \quad \text{Equation IV}$$

$$Y = dv \left\{ \left[ \frac{\sum_{i=1}^{r} \left( i \sum_{j=1}^{c} Sij \right)}{\sum_{i=1}^{r} \sum_{j=1}^{c} Sij} \right] - 1 \right\} \quad \text{Equation V}$$

Where, dh is the horizontal distance between sensing elements 108a-108l, dv is the vertical distance between sensing elements 108a-108l, i is the row aerator, j is the column iterator, r is the largest row number, and c is the largest column number.

Per Equation IV, to determine the horizontal distance X of a touch from the touch panel origin 116, micro-controller 120 executes computer readable, instructions to sum the normalized sensor values Sij of the sensing elements 108a-108l in a column to provide a column sensor value for the column and micro-controller 120 multiplies this column sensor value by the column number (1-4), as referenced from the origin 116, to provide a column weighted sensor value for the column. Micro-controller 120 does this for each of the columns (1-4) i.e., micro-controller 120 sums normalized sensor values Sij of sensing elements 108a, 108e, and 108i in column 112a (column 1) to provide a column 1 sensor value and then multiplies the column 1 sensor value by the number 1 to provide a column 1 weighted sensor value, micro-controller 120 sums normalized sensor values Sij of sensing elements 108b, 108f, and 108j in column 112b (column 2) to provide a column 2 sensor value and then multiplies the column 2 sensor value by the number 2 to provide a column 2 weighted sensor value, micro-controller 120 sums normalized sensor values Sij of sensing elements 108c, 108g, and 108k in column 112c (column 3) to provide a column 3 sensor value and then multiplies the column 3 sensor value by the number 3 to provide a column 3 weighted sensor value, and micro-controller 120 sums normalized sensor values Sij of sensing elements 108d, 108h, and 108l in column 112d (column 4) to provide a column 4 sensor value and then multiplies the column 4 sensor value by the number 4 to provide a column 4 weighted sensor value. Next, micro-controller 120 sums the column weighted sensor values for columns 1-4 to provide a column total.

To provide a horizontal distance multiplier, micro-controller 120 determines an array sensor value total by summing the normalized sensor values Sij of all sensing elements 108a-108l in the array of sensing elements 102 and dividing the column total by the array sensor value total. To determine the horizontal distance X of the touch from the origin 116, micro-controller 120 subtracts the number 1 from the horizontal distance multiplier and multiplies the result by the horizontal distance dh between sensing elements 108a-108l.

Per Equation V, to determine the vertical distance Y of a touch from the touch panel origin 116, micro-controller 120 executes computer readable instructions to sum the normalized sensor values Sij of the sensing elements 108a-108l in a row to provide a row sensor value for the row and micro-controller 120 multiplies this row sensor value by the row number (1-3), as referenced from the origin 116, to provide a row weighted sensor value for the row. Micro-controller 120 does this for each of the rows (1-3), i.e., micro-controller 120 sums normalized sensor values Sij of sensing elements 108a-108d in row 110a (row 1) to provide a row 1 sensor value and then multiplies the row 1 sensor value by the number 1 to provide a row 1 weighted sensor value, micro-controller 120 sums normalized sensor values Sij of sensing elements 108e-108h in row 110b (row 2) to provide a row 2 sensor value and then multiplies the row 2 sensor value by the number 2 to provide a row 2 weighted sensor value, and micro-controller 120 sums normalized sensor values Sij of sensing elements 108i-108l in row 110c (row 3) to provide a row 3 sensor value and then multiplies the row 3 sensor value by the number 3 to provide a row 3 weighted sensor value. Next, micro controller 120 sums the row weighted sensor values for rows 1-3 to provide a row total.

To provide a vertical distance multiplier, micro-controller 120 determines the array sensor value total by summing the normalized sensor values Sij of all sensing elements 108a-108l in the array of sensing elements 102 and dividing the row total by the array sensor value total. To determine the vertical distance Y of the touch from the origin 116, micro-controller 120 subtracts the number 1 from the vertical distance multiplier and multiplies the result by the vertical distance dv between sensing elements 108a-108l.

In examples of the present disclosure, touch location is determined using an array of individual sensing elements made from a single layer of ITO and a less powerful and less costly control device, which makes examples of the present disclosure more suitable for lower end products.

Figure 4:
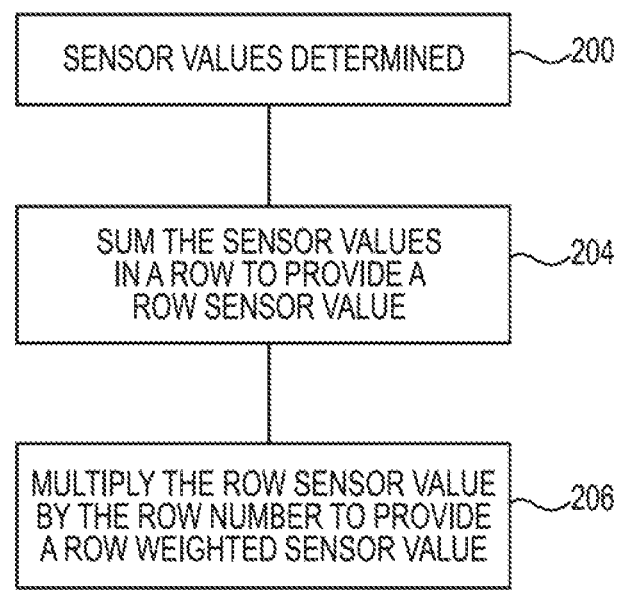
FIG. 4 is a flow chart diagram illustrating one example of a method of sensing a touch on a touch panel.

FIG. 4 is a flowchart diagram illustrating one example of a method of sensing a touch on a touch panel, such as touch panel 20 of FIG. 1 and touch panel 100 of FIG. 3. At 200, sensor values from sensing elements, such as sensing elements 28a-28l and sensing elements 108a-108l, in an array of sensing elements, such as the array of sensing elements 22 and the array of sensing elements 102, are determined using a control device, such as control device 24 and control device 104.

At 202, the control device sums the sensor values of multiple sensing elements in a row to provide a row sensor value. At 204, the control device multiplies the row sensor value by the row number, as referenced from the origin of the array of sensing elements, to provide a row weighted sensor value. In some examples, the control device sums the row weighted sensor values of multiple rows to provide a row total, determines an array sensor value total, and divides the row total by the array sensor value total to provide a vertical distance multiplier that is used to determine the vertical distance from the origin of the array of sensing elements.

In some examples, the control device sums the sensor values of multiple sensing elements in a column to provide a column sensor value. The control device multiplies the column sensor value by the column number, as referenced from the origin of the array of sensing elements, to provide a column weighted sensor value. The control device sums the column weighted sensor values of multiple columns to provide a column total, determines the array sensor value total, and divides the column total by the array sensor value total to provide a horizontal distance multiplier that is used to determine the horizontal distance from the origin of the array of sensing elements.

In some examples, the sensor values are normalized sensor values, where the control device receives raw sensor values and normalizes the raw sensor values to provide normalized sensor values that are used to determine the vertical and horizontal distances of a touch from the origin of the array of sensing elements.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A touch panel system comprising:
    an array of sensing elements in rows and columns; and
    a device to sum sensor values of multiple sensing elements in a column to provide a column sensor value and to multiply the column sensor value by a column number to provide a column weighted sensor value to determine a horizontal distance in the array.

2. The touch panel system of claim 1, wherein the device to sum the column weighted sensor value of multiple columns to provide a column total and to divide the column total by an array sensor value total to provide a horizontal distance multiplier to determine the horizontal distance in the array.

3. The touch panel system of c wherein the sensor values are normalized sensor values.

4. The touch panel system of claim 3, wherein the normalized sensor values are raw sensor values normalized in a linear normalization algorithm.

5. The touch panel system of claim 1, wherein the device to sum sensor values of multiple sensing elements in a row to provide a row sensor value and to multiply the row sensor value by a row number to provide a row weighted sensor value to determine a vertical distance in the array.

6. The touch panel system of claim 5, wherein the device to sum the row weighted sensor value of multiple rows to provide a row total and to divide the row total by an array sensor value total to provide a vertical distance multiplier to determine the vertical distance in the array.

7. A touch panel system comprising:
    an array of sensing elements having an origin and sensing elements in rows and columns; and
    a device to determine a horizontal touch distance from the origin, the device to sum sensor values of multiple sensing elements in a column to provide a column sensor value and to multiply the column sensor value by a column number to provide a column weighted sensor value and to sum the column weighted sensor value of multiple columns to provide a column total.

8. The touch panel system of claim 7, wherein the device to divide the column total by an array sensor value total to provide a horizontal multiplier to determine the horizontal touch distance.

9. The touch panel system of claim 7, wherein the device to determine a vertical touch distance from the origin, the device to sum sensor values of multiple sensing elements in a row to provide a row sensor value and to multiply the row sensor value by a row number to provide a row weighted sensor value and to sum the row weighted sensor value of multiple rows to provide a row total.

10. The touch panel system of claim 9, wherein the device to divide the row total by an array sensor value total to provide a vertical multiplier to determine the vertical touch distance.

11. A method comprising:
    determining, with a control device, sensor values from sensing elements in an array of sensing elements having rows and columns of sensing elements;
    summing, with the control device, the sensor values of multiple sensing elements in a row to provide a row sensor value; and
    multiplying, with the control device, the row sensor value by a row number to provide a row weighted sensor value for determining a vertical touch distance in the array of sensing elements.

12. The method of claim 11, comprising:
    summing the row weighted sensor value of multiple rows to provide a row total;
    determining an array sensor value total; and
    dividing the row total by the array sensor value total to provide a vertical distance multiplier.

13. The method of claim 11, comprising:
    summing sensor values of multiple sensing elements in a column to provide a column sensor value; and
    multiplying the column sensor value by a column number to provide a column weighted sensor value.

14. The method of claim 13, comprising:
    summing the column weighted sensor value of multiple columns to provide a column total;
    determining an array sensor value total, and
    dividing the column total by the array sensor value total to provide a horizontal distance multiplier.

15. The method of claim 11, wherein determining, with the control device the sensor values comprises:
    measuring raw sensor values from the sensing elements in the array of sensing elements; and
    normalizing the raw sensor values in a linear normalization algorithm to provide the sensor values.

* * * * *

UNITED STATES PATENT AND TRADEMARK OFFICE
CERTIFICATE OF CORRECTION

PATENT NO. : 9,785,279 B2  
APPLICATION NO. : 15/114351  
DATED : October 10, 2017  
INVENTOR(S) : Sait Can Saydag Page 1 of 1

It is certified that error appears in the above-identified patent and that said Letters Patent is hereby corrected as shown below:

In the Claims

Column 7, Line 57, Claim 3, delete "c" and insert -- claim 1, --, therefor.

Column 8, Line 57, Claim 14, delete "total," and insert -- total; --, therefor.

Column 8, Line 61, Claim 15, delete "device" and insert -- device, --, therefor.

Signed and Sealed this  
Tenth Day of April, 2018

Andrei Iancu  
*Director of the United States Patent and Trademark Office*